United States Patent
Gray et al.

(10) Patent No.: US 10,121,229 B2
(45) Date of Patent: *Nov. 6, 2018

(54) SELF-PORTRAIT ENHANCEMENT TECHNIQUES

(71) Applicant: A9.com, Inc., Palo Alto, CA (US)

(72) Inventors: Douglas Ryan Gray, Mountain View, CA (US); Colin Jon Taylor, Orinda, CA (US); Xiaofan Lin, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/984,805

(22) Filed: Dec. 30, 2015

(65) Prior Publication Data

US 2016/0110848 A1    Apr. 21, 2016

Related U.S. Application Data

(63) Continuation of application No. 14/015,884, filed on Aug. 30, 2013, now Pat. No. 9,247,129.

(51) Int. Cl.
*G06T 5/00* (2006.01)
*H04N 5/232* (2006.01)
(Continued)

(52) U.S. Cl.
CPC .......... *G06T 5/00* (2013.01); *G06F 17/30256* (2013.01); *G06K 9/00221* (2013.01);
(Continued)

(58) Field of Classification Search
CPC . G03B 37/04; G06T 2207/10016; G06T 7/20; H04N 5/232; H04N 5/23222;
(Continued)

(56) References Cited

U.S. PATENT DOCUMENTS 8,600,191 B2 * 12/2013 Zacks ..................... G06T 11/00
345/637
2013/0108175 A1 * 5/2013 Ptucha .................... G06T 11/60
382/199

OTHER PUBLICATIONS

Non-Final Office Action issued in corresponding U.S. Appl. No. 14/015,884 dated Apr. 7, 2015.
(Continued)

*Primary Examiner* — Padma Haliyur
(74) *Attorney, Agent, or Firm* — Hogan Lovells US LLP

(57) ABSTRACT

Systems and approaches are provided for optimizing self-portraiture. The background of the self-portrait can be enhanced by image registration or stitching techniques of images captured using one or more conventional cameras. Multiple standard resolution images can be stitched together to generate a panoramic or a composite image of a higher resolution. Foreground elements, such as one or more representations of users, can also be enhanced in various ways. The representations of the users can be composited to exclude undesirable elements, such as image data of one of the users extending her arm to capture the self-portrait. An ideal pose of the users can automatically be selected and other image enhancements, such as histogram optimization, brightness and contrast optimization, color-cast correction, or reduction or removal of noise, can automatically be performed to minimize user effort in capturing self-portraits.

16 Claims, 8 Drawing Sheets

(51) Int. Cl.
*H04N 5/272* (2006.01)
*G06F 17/30* (2006.01)
*G06K 9/00* (2006.01)
*G06T 5/30* (2006.01)
*G06T 11/60* (2006.01)
*G06T 7/11* (2017.01)
*G06T 7/194* (2017.01)

(52) U.S. Cl.
CPC .............. *G06T 5/30* (2013.01); *G06T 7/11* (2017.01); *G06T 7/194* (2017.01); *G06T 11/60* (2013.01); *H04N 5/23222* (2013.01); *H04N 5/272* (2013.01); *G06T 2207/10004* (2013.01); *G06T 2207/20221* (2013.01); *G06T 2207/30201* (2013.01); *H04N 5/23238* (2013.01)

(58) Field of Classification Search
CPC ........... H04N 5/23238; H04N 5/23248; H04N 5/23258; H04N 1/00286
See application file for complete search history.

(56) References Cited

OTHER PUBLICATIONS

Notice of Allowance issued in corresponding U.S. Appl. No. 14/015,884 dated Sep. 30, 2015.

* cited by examiner

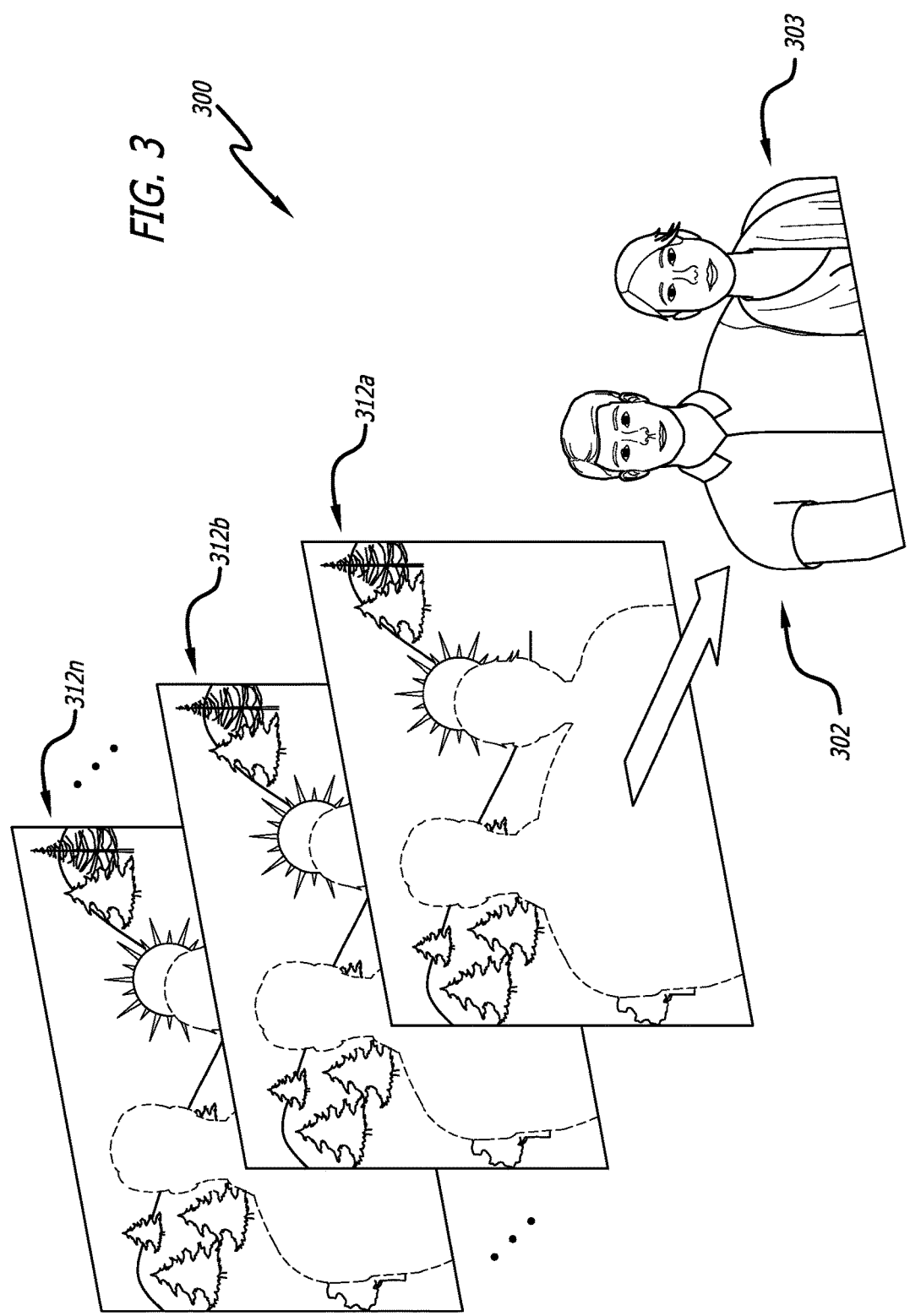

SELF-PORTRAIT ENHANCEMENT TECHNIQUES

CROSS REFERENCE TO RELATED APPLICATION

This application is a Continuation of, and accordingly claims the benefit of, U.S. patent application Ser. No. 14/015,884 filed with the U.S. Patent and Trademark Office on Aug. 30, 2013, which is hereby incorporated herein by reference.

BACKGROUND

Many personal computing devices, such as smart phones, tablets, and laptops include cameras to enable capture of digital image data, such as digital photographs or videos. Such personal computing devices also often include a display screen on a same surface as at least one camera for capturing digital photographs or videos of subject matter facing the display, such as a user of the device. This feature of personal computing devices has increased the practice of a mode of photography known as the self-portrait, wherein one or more users capture photos or videos of themselves unaided by physical stabilization equipment or the intervention of another user. That is, a user can capture image data including at least a portion of the user without the assistance of additional camera accessories, such as a tripod, or another user due to unavailability or other reasons. In such instances, a user may hold the device at an arm's length with the camera's field of view directed towards the user to take a photo of herself. Although a personal computing device incorporating a camera on the same surface as a display screen of the device can help facilitate self-portraiture, self-portraits still suffer from various defects.

BRIEF DESCRIPTION OF THE DRAWINGS

Various embodiments in accordance with the present disclosure will be described with reference to the drawings, in which:

FIG. 3 illustrates an example approach for segmenting foreground elements from background elements of image data in accordance with an embodiment;

DETAILED DESCRIPTION

Conventional computing devices enable users to take self-portraits but the end results may be less than desirable. For example, certain conventional computing devices may not include a display screen on the same surface as a camera used to take a self-portrait. Self-portraits taken by a user with such a device may not be aligned as intended, such as the representation of the user being skewed or off-center or the top of the user's head being cropped off. Some conventional computing devices may include a display element on the same surface as the camera used to capture a self-portrait. Although such conventional devices can provide a user with more control over framing the user within a self-portrait by enabling a user to "preview" the self-portrait, the image data capable of being captured by such devices can be limited to subject matter that is at most an arm's length away from the user. As a result, self-portraits acquired by conventional devices oftentimes include a disproportionate portion of the user and/or very little of the background of where the user is situated. Further, as the device is typically held at arm's length, the user may have limited control over camera settings such that the representation of the user in the self-portrait may be underexposed or overexposed depending on lighting conditions.

Systems and methods in accordance with various embodiments of the present disclosure may overcome one or more of the aforementioned and other deficiencies experienced in conventional approaches for capturing self-portraits. In particular, various embodiments enable a user to acquire optimized self-portraits with minimal user interaction. In some embodiments, the self-portrait may be a larger size (e.g., panorama or vertical panorama) and/or higher resolution than would be capable of being captured by a conventional camera. In some embodiments, the representation of the user in a self-portrait can be appropriately sized such that more of the background can be included in the self-portrait than might be possible from a user holding a device at arm's length. In at least some embodiments, histogram equalization or optimization, brightness and contrast optimization, color-cast correction, reduction or removal of noise (e.g., dark-current shot noise, photon shot noise, fixed pattern noise, bias noise, and quantization noise), reduction or removal of specular reflection, and other image optimization or enhancement techniques can also be automatically applied to self-portraits.

Various other functions and advantages are described and suggested below in accordance with the various embodiments.

Figure 1:
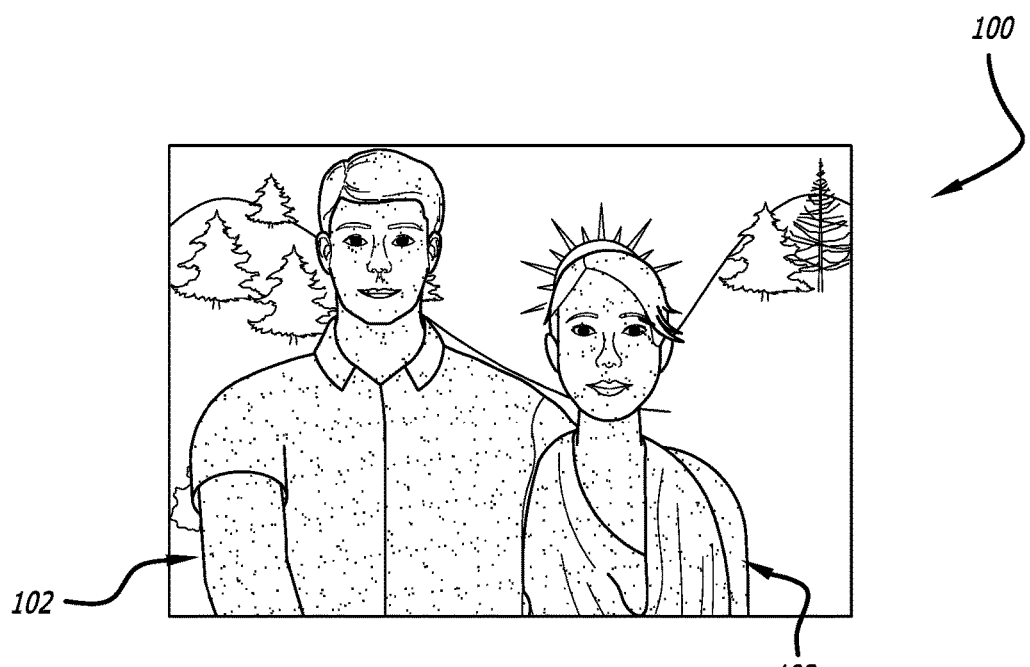
FIG. 1 illustrates an example of a self-portrait image.

FIG. 1 illustrates an example image 100 of a self-portrait captured using a conventional computing device (not shown) and/or using a conventional approach. In this example, users 102 and 103 can be seen in front of a scenic background. Users 102 and 103 take up a substantial portion of image 100 because the distance between the users and the computing device may be limited to the length of one of the users' arm during self-portraiture. Although the users could utilize a device such as a tripod (and operate the device via timer, remote control, or voice command) or have another person in the vicinity take the photograph, such resources may not be available or self-portraiture may be preferred. Thus, in this example, image 100 is acquired by user 102 pointing a computing device toward users 102 and 103 and triggering a shutter release of a camera of the computing device. Image 100 is captured at a standard image resolution, such as 1600×1200 pixels or 2 Megapixels. Image 100 also illustrates certain flaws or defects with conventional self-portrait image data. For example, users 102 and 103 can be seen as underexposed in the image (as indicated by the shading) due to the relative brightness of the background. In some conventional self-portraits images, blurring can also be more pronounced because the user may be holding the device with one hand that can result in camera-shake and blurring of the image.

Figure 2:
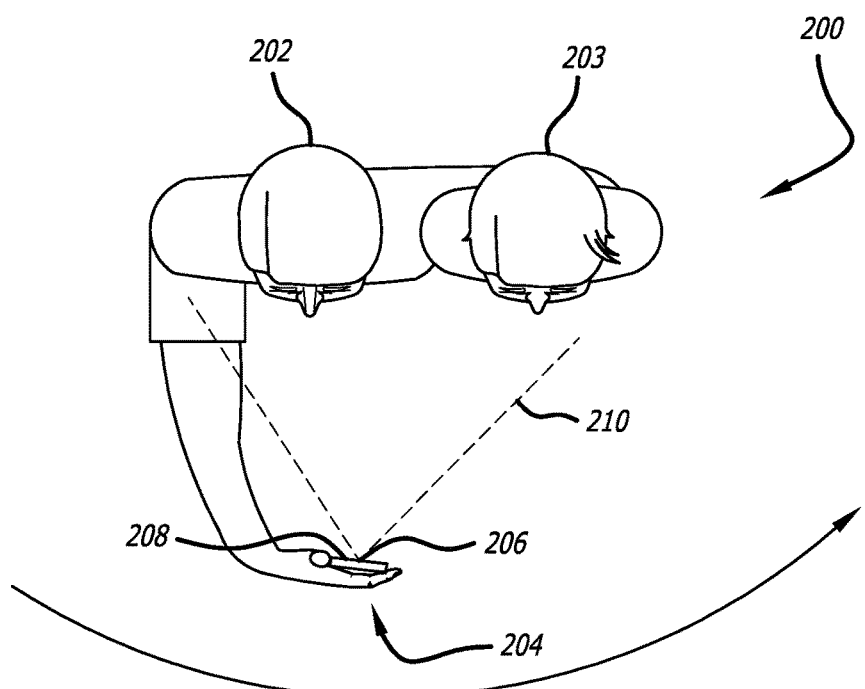
FIG. 2 illustrates an example approach for capturing self-portrait image data in accordance with an embodiment.

Approaches in accordance with various embodiments can provide users with higher quality self-portrait image data. FIG. 2 illustrates an example approach of capturing self-portrait image data in accordance with an embodiment. Although a portable computing device (e.g., a smart phone, tablet, or portable media player) is shown that can be held in the user's hands, it should be understood that other types of computing devices can utilize aspects of the various embodiments as should be apparent in light of the teachings and suggestions contained herein. The computing device can include at least one camera 206 located on the front of the device and on the same surface as a display screen 208 to capture image data of subject matter facing the front of the device, such as the users 202 and 203 viewing the display screen. It should be understood that, while the components of the example device are shown to be on a "front" of the device, there can be similar or alternative components on the "top," "side," or "back" of the device as well (or instead). Further, directions such as "top," "side," and "back" are used for purposes of explanation and are not intended to require specific orientations unless otherwise stated. In some embodiments, a computing device may also include more than one camera on the front of the device and/or one or more cameras on the back (and/or sides) of the device capable of capturing image data facing the back surface (and/or top, bottom, or side surface) of the computing device. In this example, the camera 206 comprises a digital camera incorporating a CMOS image sensor. In other embodiments, a camera of a device can incorporate other types of image sensors (such as a charged couple device (CCD)) and/or can incorporate multiple cameras, including at least one wide-angle optical element, such as a fish eye lens, that enables the camera to capture images over a wide range of angles, such as 180 degrees or more. Further, each camera can comprise a digital still camera, configured to capture subsequent frames in rapid succession, or a video camera able to capture streaming video. In still other embodiments, a computing device can include other types of imaging elements, such as ambient light sensors, IR sensors, and other optical, light, imaging, or photon sensors.

In this example, user 202 can be seen sweeping the device 204 from right to left (according to the user's perspective). Although not illustrated in FIG. 2, it will be appreciated that the user may also be moving the device up and down and/or forward and backward (according to the user's perspective) as the user pans the device from right to left. In some embodiments, camera 206 may be operated in video mode at a conventional sampling rate (e.g., 30 frames per second) such that the camera captures multiple images or frames of the users 202 and 203 and the background while the user is panning the device. In other embodiments, the camera may operate according to a sampling rate based on content of the image data or other sensor data. For example, the camera may capture a first image, analyze image data as the user moves the device, and capture a second image when the content of the image data differs from the content of the first image by some threshold value or percentage. Alternatively, or in addition, a computing device can include inertial sensors, such as an accelerometer, gyroscope, and/or magnetometer, which can be used to detect device motion. The image sampling rate can be based on movement of the device, such as an image being captured when the device has been moved 10.0 cm. Those embodiments that rely on inertial sensors may also improve processing for image registration or stitching by leveraging device motion data during image registration/stitching. Approaches for image registration or stitching aided by inertial sensors are known to those of ordinary skill in the art, and will not be discussed herein in detail. In at least some embodiments, the display screen can be used to guide the user as to how to move the device. For instance, the display screen can serve as a dynamic "canvas" that is "painted" in and resized as the user moves the device. Certain portions of the canvas will remain "unpainted" until the user moves the device to a position such that those unpainted portions come within the field of view of the camera. The corresponding image data can be captured and registered/stitched or painted in. The canvas may also grow in size depending on the movement of the device and the extent of the background of a scene captured by the device. In some embodiments, a device may also include multiple cameras on various surfaces of the device that can be used for self-portraiture. The relative positions and orientations of the cameras with respect to one another can be used as a cue for image registration or stitching in such embodiments.

FIG. 3 illustrates an example image segmentation approach 300 for producing optimized self-portrait image data in accordance with an embodiment. In this example, a set of images 312a-312n have been captured using a process, such as discussed with respect to FIG. 2 and elsewhere herein. The set of images 312a-312n may comprise a set of video frames, images sampled at a rate based on the content of the images, images sampled based on motion of the device, multiple images captured by multiple cameras, or some combination thereof. At least a portion of the images 312a-312n will include one or more "foreground" elements and one or more "background" elements. In this example, the foreground elements include users 302 and 303 and the background elements include the image data (e.g., pixels) that do not correspond to the users. In various embodiments, the foreground elements can be segmented from the background based on inter-image optical flow. Optical flow is an approximation of motion of objects, surfaces, and edges in a given sequence of images. As the user is panning or otherwise moving the device, the background elements may move much faster than the background elements such that the magnitude of the optical flow of pixels corresponding to the background elements may be greater than the optical flow of pixels corresponding to the foreground elements. This information can be used to segment foreground and background elements of image data. Approaches for determining optical flow can include block-based methods, differential methods, or phase-based methods.

Block matching is a correlation technique that searches for the best match between an image block of a first image and a specified area of a second image. The metric used to determine the best matching block in the second image can be based upon maximizing the normalized cross-correlation function (NCF) or minimizing a criterion, such as the mean squared error (MSE), mean absolute difference (MAD), or the number of threshold differences (NTD). For example, if (u, v) represents a motion vector candidate of an image block of size M×N, and f(m, n, t) is the image intensity at the image coordinate (m, n) of the tth image, then these functions can be defined as follows:

$$NCF(u, v) = \frac{\sum\sum f(m, n, t)f(m-u, n-v, t-1)}{[\sum\sum f^2(m, n, t)]^{1/2}[\sum\sum f^2(m-u, n-v, t-1)]^{1/2}}$$

$$MSE(u, v) = \frac{1}{MN} \sum_{m=0}^{M-1} \sum_{n=0}^{N-1} [f(m, n, t) - f(m - u, n - v, t - 1)]^2$$

$$MAD(u, v) = \frac{1}{MN} \sum_{m=0}^{M-1} \sum_{n=0}^{N-1} |f(m, n, t) - f(m - u, n - v, t - 1)|$$

$$NTD(u, v) = \frac{1}{MN} \sum_{m=0}^{M-1} \sum_{n=0}^{N-1} g(f(m, n, t), f(m - u, n - v, t - 1)),$$

where, $$g(\alpha, \beta) = \begin{cases} 1 & \text{if } |\alpha - \beta| > T_0 \\ 0 & \text{if } |\alpha - \beta| \le T_0 \end{cases}$$

is the counting function with threshold $T_0$.

Various approaches can be used to search for the best matching block in a second image to a block of first image. In one embodiment, an exhaustive search is used to examine every candidate block inside a search region. While a full or exhaustive search is guaranteed to provide the best matching candidate block, such an approach can be resource intensive and may be less preferable if performed on-device rather than via a remote distributed computing server system. Thus, in other embodiments, fast searching algorithms can be used to reduce the amount of computational complexity, data input, and output bandwidth compared to the full or exhaustive search. A fast searching algorithm typically starts with analysis of an initial set of candidate blocks scattered across the search region. The distance between two nearby candidate blocks, referred to as the step size, may change based on the results of analyzing the initial set of candidate blocks. For example, after the initial analysis is completed, a typical fast search strategy proceeds by moving to the most promising candidate block and conducting another set of searches using a smaller step size. This process is repeated until there are no additional steps that can be taken and an approximate best matching block is determined from the candidate blocks analyzed. Fast-search block matching strategies include the three step search, 2D logarithmic search, and conjugate direction search, and improvements to reduce computation such as subsampling, hierarchical block matching, overlapped block matching, and other variations.

In some embodiments, differential methods can be used to estimate optical flow by computing spatial and temporal derivatives. Differential techniques compute motion from spatial and temporal derivatives of image features such as intensities or filtered versions of the image. Such techniques are based on the assumption that all temporal intensity changes are due to motion only. This can be represented by:

$$I(x,y,t) = I(x+\delta x, y+\delta y, t+\delta t),$$

where $I(x, y, t)$ is a center pixel in a n×n neighborhood of pixels and moves by $\delta x$, $\delta y$ in time $\delta t$. For small displacements, a linearized Taylor series expansion yields the motion constraint equation:

$$\nabla I \cdot \vec{v} = -I_t,$$

where $\nabla I = (I_x, I_y)$ is the spatial intensity gradient and $\vec{v} = (v_x, v_y)$ is the image velocity or optical flow at pixel (x, y) at time t. The motion constraint equation is an ill-posed problem in that it yields one equation and two unknowns. This is a mathematical consequence of the aperture problem, wherein there may be insufficient local image intensity structure to measure full image velocity. A typical way to overcome the ill-posedness problems of differential methods is to use smoothing techniques and smoothness assumptions prior to differentiation to remove noise and to stabilize the differentiation process. Local differential methods use spatial constancy assumptions while global differential techniques supplement the motion constraint with a regularizing smoothness term.

In various embodiments, local approaches based on the Lucas-Kanade optical flow algorithm can be used to determine inter-image motion. The algorithm is set forth in Lucas, Bruce D. et al. "An iterative image registration technique with an application to stereo vision." *In Proceedings of the 7th international joint conference on Artificial intelligence.* 1981, and is incorporated herein by reference. The Lucas-Kanade algorithm estimates displacement of a neighborhood of pixels by analyzing changes in pixel intensity from the known intensity gradients of the image in that neighborhood. As mentioned, for a simple pixel, there are two unknowns and one equation, such that the system is ill-posed or under-determined. Therefore, a neighborhood of pixels is used to derive additional equations to make the system over-determined. The system can then be solved using a least squares solution that averages the motion vectors over the neighborhood. The Lucas-Kanade method attempts to minimize:

$$\sum_{x,y \in \Omega} W^2(x, y) [\nabla I(x, y, t) \cdot \vec{v} + I_t(x, y, t)]^2,$$

where W(x,y) is a windowing function that gives more influence to constraints at the center of the neighborhood than those at the periphery. The result of the Lucas-Kanade algorithm is a set of motion vectors distributed over the image estimating movement of objects in the scene.

In other embodiments, a global approach, such as the Horn-Schunk algorithm or a variation thereof, can be used to determine inter-image motion. The Horn-Schunk algorithm is set forth in Horn, Berthold K P et al. "Determining optical flow." *Artificial intelligence* 17, no. 1 (1981): 185-203, which is incorporated herein by reference. Horn-Schunk uses a global regularization calculation as an additional constraint. Horn-Schunk assumes that images consist of objects that undergo rigid motion such that motion will be smooth over relatively large areas of the image. The Horn-Schunk algorithm attempts to minimize:

$$\int_D (\nabla I \cdot \vec{v} + I_t)^2 + \lambda^2 \left[ \left( \frac{\partial v_x}{\partial x} \right)^2 + \left( \frac{\partial v_x}{\partial y} \right)^2 + \left( \frac{\partial v_y}{\partial x} \right)^2 + \left( \frac{\partial v_y}{\partial y} \right)^2 \right] dx dy$$

defined over the image domain D, where the magnitude of $\lambda$ corresponds to the influence of the smoothness term.

In still other embodiments, an approach combining local and global differential techniques can be used to determine inter-image motion. Such a technique may be referred to as a combined local-global (CLG) method and is described in Bruhn, Andrés, Joachim Weickert, and Christoph Schnörr. "Lucas/Kanade meets Horn/Schunck: Combining local and global optic flow methods." *International Journal of Computer Vision* 61, no. 3 (2005): 211-231, which is incorporated herein by reference.

In some embodiments, phase correlation is used to determine inter-image motion. Phase correlation is a frequency domain technique based on the shift property of the Fourier transform for measuring motion. According to this principle, a shift in the spatial domain is equivalent to a phase shift in the frequency domain. To determine inter-image motion using phase correlation, the cross power spectrum (CPS) of two images is determined. If one image is a shifted replica of the other, i.e., $f_2(x,y)=f_1(x+x_0, y+y_0)$ then the phase of the cross power spectrum of the two images $f_1$ and $f_2$ can be defined as:

$$CPS(f_1, f_2) = \frac{F_1(\xi, \eta) \cdot F_2^*(\xi, \eta)}{|F_1(\xi, \eta) \cdot F_2^*(\xi, \eta)|} = e^{j2\pi(\xi x_0 + \eta y_0)}$$

where F is the Fourier transform of the image f and F* is the complex conjugate. The inverse Fourier transform of the cross power spectrum is an impulse whose coordinates are located at $(x_0, y_0)$, the required shift.

In some embodiments, other image segmentation approaches can be used to partition an image into foreground and background elements, such as mean-shift clustering, graph cuts, and active contours. The mean-shift approach finds clusters in the spatial and color space [l, u, v, x, y] where l is the brightness, u and v are the chrominance, and x and y are the location. A large number of hypothesized cluster centers are randomly chosen, and each cluster center is moved to the mean lying inside a multidimensional ellipsoid centered on the cluster center, with some of clusters merging during this mean-shift process. The vector corresponding to the old and new cluster centers are called the mean-shift vectors, and the mean-shift vectors are calculated iteratively until the cluster centers do not change position. In graph cut methods, image segmentation is approached as a graph partitioning problem with pixels representing nodes of a graph that are partitioned into disjoint subgraphs by pruning the weighted edges of the graph. The total weight of the pruned edges between two subgraphs is called a cut, and the weights may be based on similarities in color, brightness, and/or texture. In one embodiment, a minimum cut criterion can be used to find partitions that minimize a cut. In another embodiment, a normalized cut can be used that depends on edge weights as well as the ratio of the total connection weights of nodes in each partition to all nodes of the graph. In active contours approaches, an object is segmented by transforming a closed contour of the object's boundary such that the contour tightly encloses the object region according to an energy function, such as:

$$E(C) = \int_0^1 E_{int}(v) + E_{im}(v) E_{ext}(v) ds,$$

where s is the arc-length of the contour C, $E_{int}$ specifies the regularization constraints, $E_{im}$ is the image-based energy, and $E_{ext}$ specifies additional constraint. $E_{int}$ typically includes a curvature term, first-order ($\nabla v$), or second-order ($\nabla^2 v$) continuity terms to find the shortest contour. The image-based energy, $E_{im}$, can be computed locally or globally. Local information is often determined from an image gradient evaluated around the contour of the foreground elements while global features are computed inside and outside the foreground elements. Global features can include color and texture. In some embodiments, image segmentation can occur on the computing device. In other embodiments, image segmentation can occur at a remote server system.

Figure 4A:
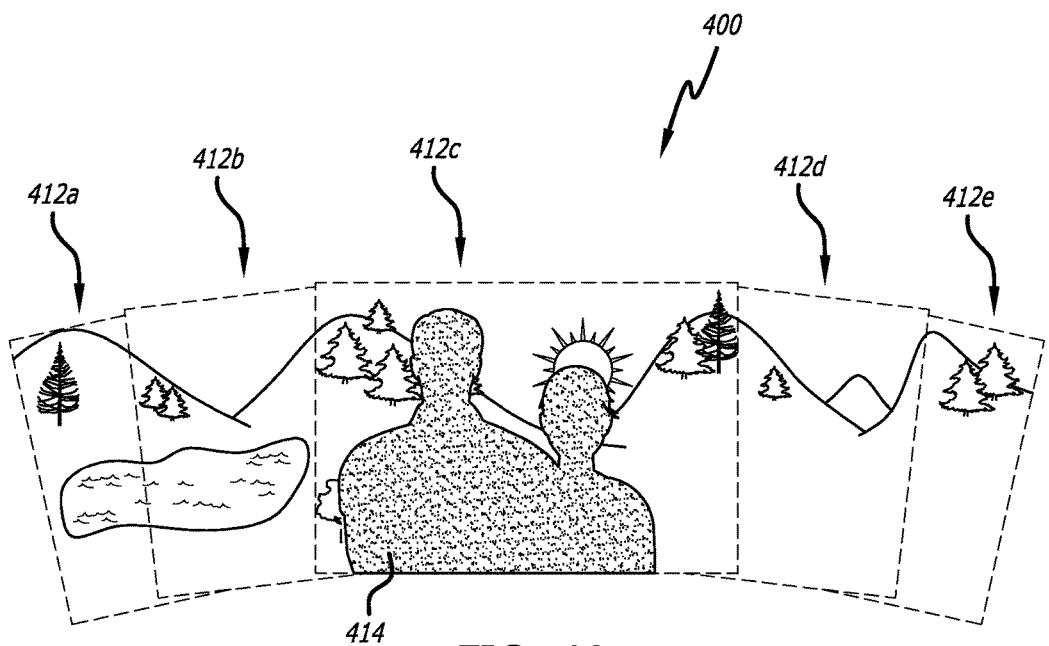
FIGS. 4A-B illustrate an example approach for generating an optimized background for a self-portrait image in accordance with an embodiment.

FIG. 4A illustrates an example approach for generating a preliminary background image 400 for a self-portrait image in accordance with an embodiment. In this example, the preliminary background image 400 is obtained by compositing image data comprising several background images 412a-412e. Background images 412a-412e comprise image data including background elements and excluding foreground elements 414 using an image segmentation process such as that discussed with respect to FIG. 3 and elsewhere herein. The process of compositing several related, potentially overlapping images into a single image can sometimes be referred to as image registration or stitching. Image registration/stitching techniques can include direct methods or feature-based methods. Direct methods can refer to pixel-to-pixel matching and may operate according to an error metric used as a threshold to compare how well two images correspond. Once the error metric has been defined, an appropriate search approach is determined to find correspondences between images. A brute force search approach can be used to determine such correspondences, but may be computationally expensive. Therefore, hierarchical coarse-to-fine techniques based on image pyramids can be used. Fourier transforms can also be used to speed up computation. Additional steps operating at the sub-pixel level such as those based on expansion of a Taylor series or parametric motion models of the image data can also be used.

Feature-based methods match salient features between respective images and may include the steps of extracting suitable features from the respective images, matching such features to establish a global correspondence, estimating the geometric transformation between the respective images, and resampling and transforming the images to generate a composite image. Features can be points of interests or key points within an image and may include edges (detected using, e.g., Canny edge detection), corners (detecting, using, e.g., Harris corner detection or Smallest Univalue Segment Assimilating Nucleus (SUSAN) corner detection), or regions of interest (detected, using, e.g., LaPlacian of Gaussian pyramids or Difference of Gaussian pyramids). After detecting the features, feature-based registration methods next involve feature matching techniques, such as the Scale Invariant Feature Transform (SIFT) algorithm or the Speeded up Robust Feature (SURF) algorithm. Once feature correspondences have been computed, a subset of the correspondences can be selected to estimate a transformation that will produce an accurate alignment. Methods used for transformation estimation can include RANdom Sample Consensus (RANSAC) or least median of squares (LMS) methods.

Images may be aligned according to a compositing surface or projection model. A projection model can be thought of as the canvas upon which pixels of captured images are painted. Another way of understanding the projection model is to imagine the entire field of view for all viewing angles for a particular location at a moment in time as the surface of a sphere; then the projection model may refer to a two-dimensional surface to which the entire spherical field of view is translated for purposes of display. A projection may be one of a planar surface (or rectilinear projection), a cylinder, or a sphere (or equirectangular projection). A planar projection may be suitable for images representing lower horizontal view angles but may be less advantageous for images representing horizontal angles of view greater than 120°. For example, exceeding this horizontal viewing angle may result in skewing of objects appearing at the edges of the image. A cylindrical projection can be used to capture images up to 360° horizontally but lines parallel to the horizon may be curved. In addition, a cylindrical projection may not be suitable for images representing a very large vertical angle of view where deformations can be perceived at the top and bottom of the image exceeding 55° above or below the field of horizon. A spherical or equirectangular projection may not be limited to any horizontal or vertical viewing angle but may require a special display such as a domed or hemispherical screen and/or customized viewing application. Other types of projection models can include a Mercator projection, a fisheye projection, a sinusoidal projection, and a stereographic projection.

After selecting the projection model, the registered images may be composited according to the model and the composite image may be blended to compensate for sampling and exposure differences. Sampling differences may occur in situations where images are captured by image capturing components having different resolutions. Exposure differences may be the result of auto-gain features of cameras or the tendency of certain cameras to diffuse light from the center of the image. Sampling and exposure differences can be compensated with various blending techniques known to those of ordinary skill in the art, including feathering and center-weighting, Laplacian pyramid blending, gradient domain blending, or high dynamic range imaging. In some embodiments, image registration or stitching can occur on the computing device. In other embodiments, image registration or stitching can occur at a remote server system.

In FIG. 4A, although preliminary background image 400 comprises a panorama, it will be appreciated that other backgrounds can be made of other configurable shapes (e.g., vertical panoramas) and sizes in various embodiments. Further, it will be understood that the image resolution of the background can differ from the image resolution capable of being captured by the camera of a device. For example, the maximum resolution of images capable of being captured by a camera of a device may be 3264×2448 pixels or 8.0 Megapixels. However, the self-portrait produced by various embodiments may include a panorama having dimensions such as 6528×2448 pixels.

In at least some embodiments, super-resolution techniques can also be performed to generate a self-portrait that has a finer image resolution than would be capable of being captured by the cameras of a device. Super-resolution is a class of signal processing techniques that can be used to enhance image data, such as by obtaining a higher resolution image from multiple lower resolution images and/or to obtain a higher fidelity image from multiple lower fidelity images. In general, a higher fidelity image can refer to an image that more accurately represents an object or scene as compared to a lower fidelity image of the same object or scene. A higher fidelity image can also be thought of as an image comprising a higher "pixel-to-noise" ratio as compared to a lower fidelity image, wherein the "pixel" of the "pixel-to-noise" ratio corresponds to an actual point in an object or scene. For example, a lower fidelity image may have more blur, noise, radiometric imperfections, artifacts, distortions, or other blemishes than a higher fidelity image. Super-resolution techniques can generally be divided into two main classes, those based on the spatial domain and those based on the frequency domain. An example of an approach for super-resolution in the spatial domain is the interpolation of non-uniformly spaced samples. Captured image data can be registered or stitched, resulting in a composite image including samples on a non-uniformly spaced sampling grid. These non-uniformly spaced samples are interpolated and resampled onto a higher resolution sampling grid. The higher-resolution image can be iteratively deconvolved to remove blurring, noise, imperfections, distortions, artifacts, etc. In other embodiments, super-resolution methods operating in the frequency domain can be employed. Frequency domain methods are based on the shifting property of the Fourier transform and the aliasing relationship between the continuous Fourier transform and the discrete Fourier transform. These properties are used to recover a band-limited image from a set of under-sampled (and aliased) observation images. In particular, the shift and aliasing properties can be used to derive a system of equations relating the aliased discrete Fourier transform coefficients of the observed images to samples of the continuous Fourier transform of the unknown original scene. The system of equations can be solved for the frequency domain coefficients, which can then be used to reconstruct the original scene using the inverse discrete Fourier transform. For example, the camera of a device may be limited to acquiring image data at a maximum resolution of 2560×1920 pixels or 5.0 Megapixels. However, by sampling image data of a scene at various locations and applying a super-resolution technique, a higher resolution image, such as 3872×2592 pixels or 10.0 Megalpixels, can be generated from multiple 5.0 Megapixel images. In some embodiments, super-resolution processing can occur on the computing device. In other embodiments, super-resolution processing can occur at a remote server system.

Figure 4B:
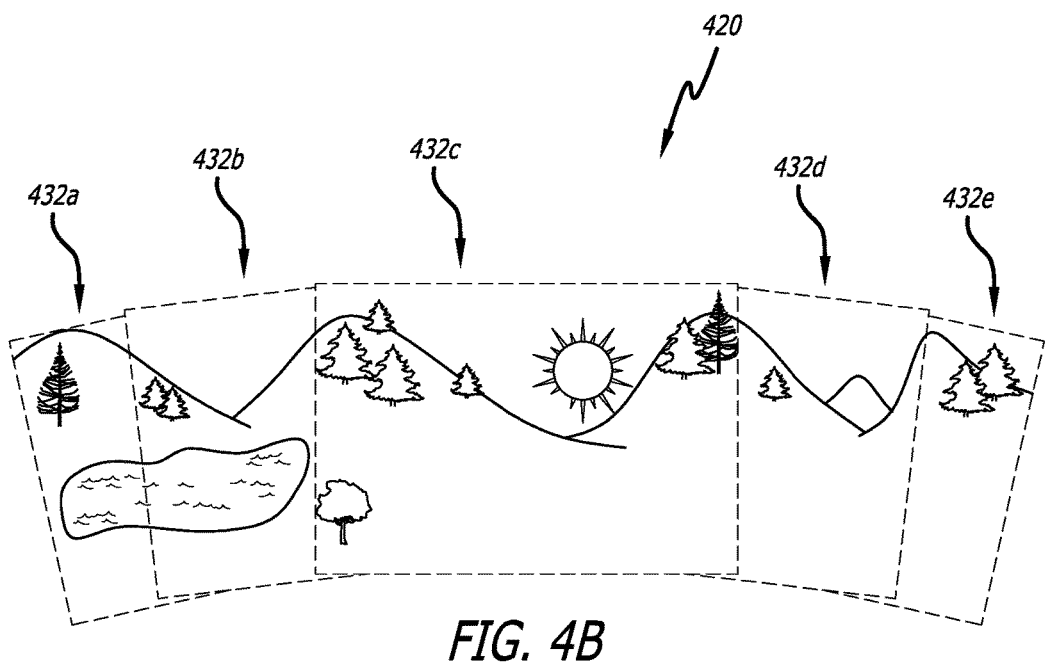

In certain situations, a composite background image may include gaps or missing regions, such as due to occlusion by foreground elements or failure by the user to capture or sample certain regions of a scene. FIG. 4B illustrates an example approach for "inpainting" to fill in an image region 414 (as depicted in FIG. 4A) previously corresponding to foreground elements of the image data. In this example, the background image 420 is obtained by inpainting pixels from various images 432a-432e of the background to fill in the portion of the background that had been occluded by the users taking a self-portrait. Inpainting is a class of computer vision methods used to reconstruct missing or corrupted regions of images and videos. Inpainting can be characterized as structural, textural, or a combination thereof. Structural inpainting uses geometric approaches for filling in missing pixels in an image or video requiring reconstruction. Textural inpainting approaches search for a repetitive pattern in a texture to fill in the missing portions of an image. Combined structural and textural inpainting approaches simultaneously perform texture and structure filling to reconstruct regions of missing or deteriorated image data. Approaches for inpainting are discussed in Bertalmio, Marcelo et al. "Navier-stokes, fluid dynamics, and image and video inpainting." *Computer Vision and Pattern Recognition,* 2001. *CVPR* 2001. *Proceedings of the* 2001 *IEEE Computer Society Conference on.* Vol. 1. IEEE, 2001, and Criminisi, Antonio et al. "Region filling and object removal by exemplar-based image inpainting." *Image Processing, IEEE Transactions on* 13.9 (2004): 1200-1212, which are each incorporated herein by reference. In some embodiments, inpainting can be performed by the computing device. In other embodiments, inpainting can be performed by a remote server system.

In at least some embodiments, a user may capture image data for a background panorama by first capturing the background that is not occluded by foreground elements. That is, the user may first capture the background without the users being present in the background. There may be a few advantages with such an approach. The resolution of a camera on a different surface as the display element (e.g., rear-facing camera) may be greater than the resolution of a camera on the same surface as the display element (e.g., front-facing camera), and the background can be captured by the user with the higher-resolution camera. Once the desired background panorama has been captured, the user may align himself in front of the background to obtain the self-portrait. Another potential advantage of acquiring image data of the background prior to taking a self-portrait is that background/foreground segmentation can be simplified. Differentiating between background and foreground elements can be more easily accomplished when the background pixels are known, and techniques such as foreground or background subtraction can be implemented. Yet another advantage of an approach of acquiring background image data beforehand is to reduce or eliminate inpainting processing. Various other advantages of such an approach are known to those of ordinary skill in the art.

Figure 5A:
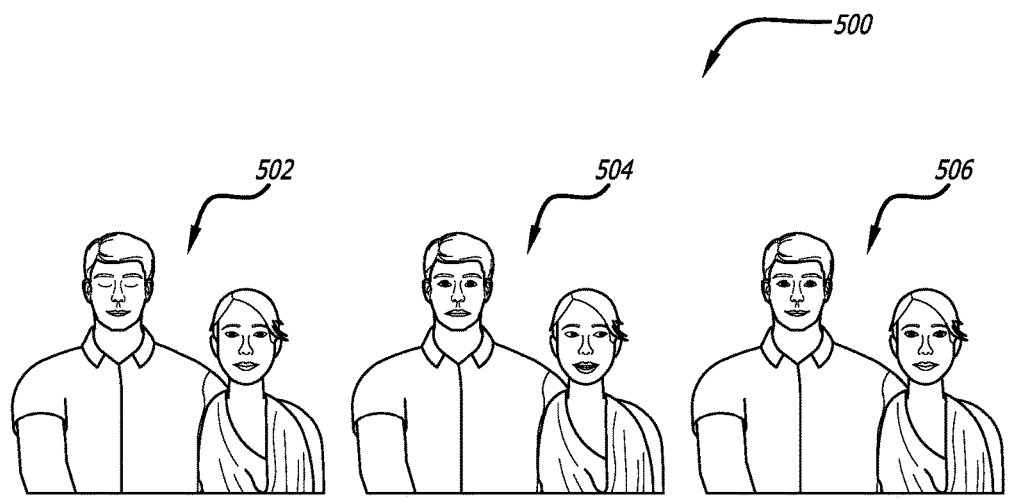
FIGS. 5A-C illustrate an example approach for obtaining optimized foreground elements for a self-portrait image in accordance with an embodiment.
Figure 5B:
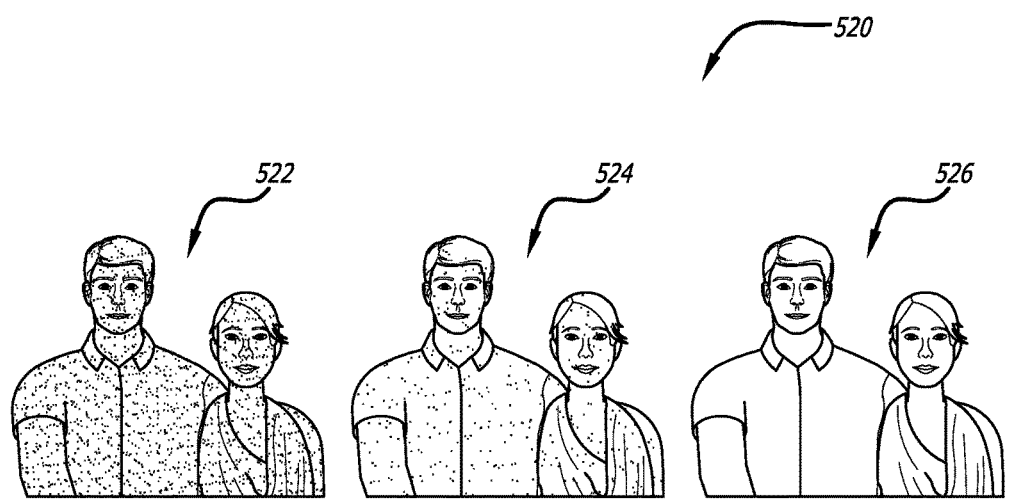
Figure 5C:
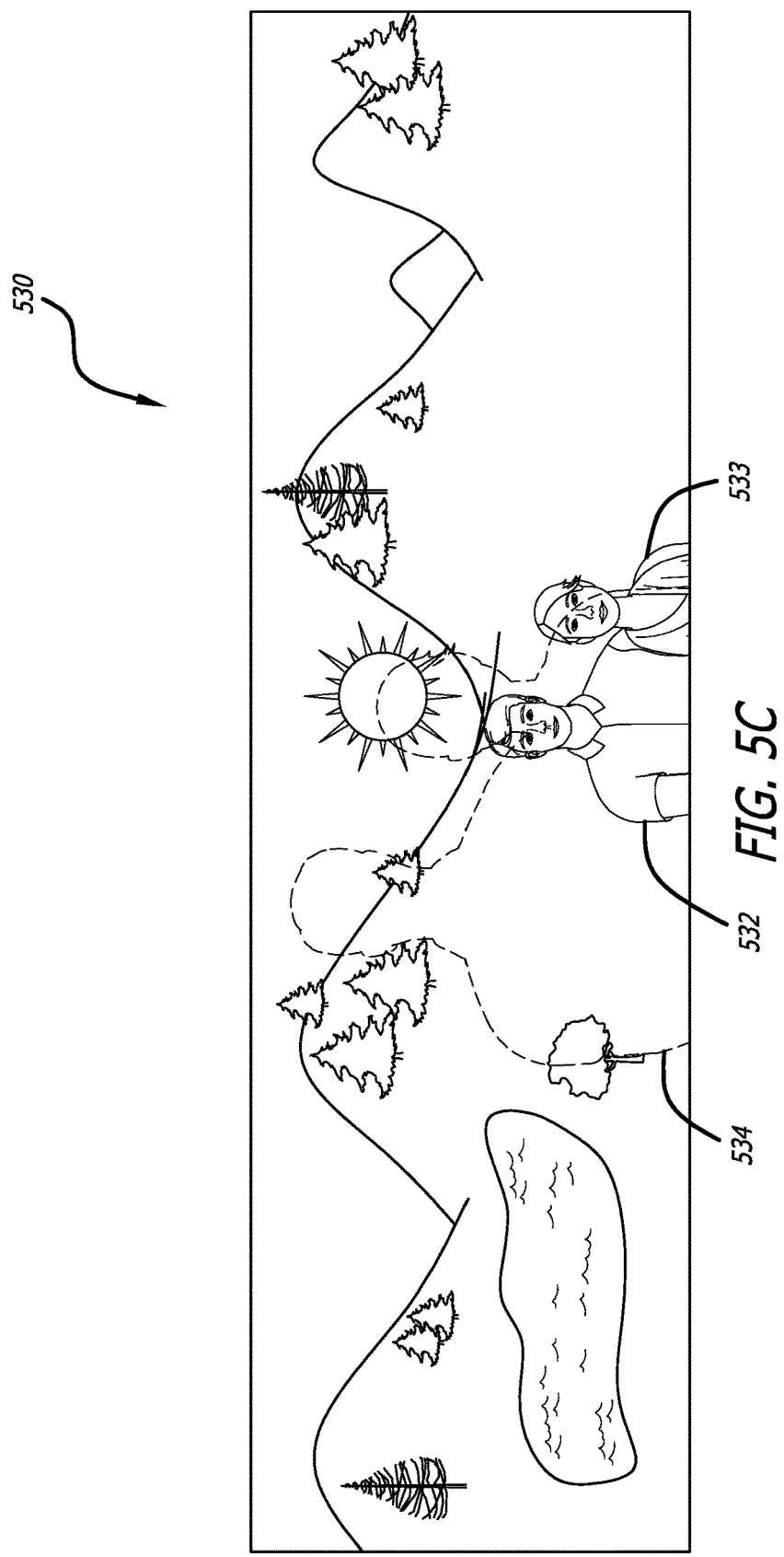

FIGS. 5A-C illustrate an example approach for generating optimized foreground elements for a self-portrait image in accordance with an embodiment. In FIG. 5A, an example 500 of several instances of foreground elements 502, 504, and 506, i.e., representations of users, is shown. These foreground instances can be obtained using an image segmentation process as discussed with respect to FIG. 3 and elsewhere herein. In instance 502, the user to the left can be seen with his eyes shut. In instance 504, the gaze of the user to the right is directed towards the left (with respect to the users). Further, the user to the right is not smiling. In instance 506, both users can be seen looking directly at the camera and smiling. In some embodiments, foreground elements can be analyzed using facial feature detection processes to determine whether each user represented in the image data has his head directed towards or away from the camera, whether each user has his eyes open or shut, whether each user is smiling, and/or other characteristics that can be configured by the user. Each foreground instance can be scored based on these various traits, and each of the foreground instances can be sorted based on the respective score of the foreground instance. In some embodiments, a highest scoring foreground instance can be "pre-selected" as the default foreground instance with a user interface enabling selection of a different foreground instance. For example, instance 506 may be pre-selected as the ideal foreground instance for a self-portrait based on facial detection processes performed on the foreground instances. However, the user may elect to choose a different foreground instance, and the sorting of the foreground instances can ease the user's search for a different preferred foreground instance. Such an approach can "automate" self-portraiture to a certain extent. The ideal foreground instance will often be the initial or default selection or be a highly ranked foreground instance such that the user may not have to search at all or at least not very long among several possible foreground instances for the self-portrait.

FIG. 5B illustrates an example 520 of several instances of foreground elements 522, 524, and 526 each corresponding to different exposures. In this example, foreground instance is the most underexposed, foreground instance 524 exhibits intermediate underexposure, and foreground instance 526 may be optimally exposed. As in the case of the ideal user pose selection shown in FIG. 5A, each foreground instance may be sorted and ranked according to exposure characteristics and the ideally exposed foreground instance can be selected as the default exposure for the self-portrait image with a user option to select a different exposure other than the default selection. In other embodiments, the exposure of the foreground elements of the self-portrait can be directly manipulated by a slider rather than selected from among the plurality of segmented foreground elements. Further, other image enhancements such as histogram optimization, brightness and contrast optimization, color-cast correction, among others, can also be automatically selected while enabling a user to select other values for these settings. Such an approach automates the self-portrait process but still provide the users control over the final self-portrait.

FIG. 5C illustrates an example composite self-portrait image 530 of at least one foreground instance and a background image generated using an approach similar to one discussed with respect to FIGS. 4A and 4B and elsewhere herein. In this example, a default selection of foreground elements 532 and 533, representing the users capturing the self-portrait, has been made based on the criteria discussed herein, such as ideal facial feature characteristics (e.g., heads pointing forwards, eyes open, smiling), ideal exposure settings, and other settings. In this example, foreground elements 532 and 533 may also be automatically sized and positioned with respect to the background image according to a certain heuristic such as the representations of users being centered and taking up no more than 50% in length and/or width of the self-portrait image. It will be appreciated that users can reconfigure these default settings according to their own personal preferences. Further, the user can adjust the size and position of the representations of the users in the self-portrait image, such as by expanding or reducing the contours 534 of the representations of the users. In some embodiments, the composite self-portrait can be post-processed using an image matting process that may remove aliasing artifacts and/or smoothen foreground and background elements of the self-portrait. Image matting involves determining a foreground color, a background color, and foreground opacity for a plurality of pixels of the foreground elements, such as the contours of the foreground elements, to blend the foreground elements with the background elements. An approach for image matting is discussed in Levin, Anat et al. "A closed-form solution to natural image matting." *Pattern Analysis and Machine Intelligence, IEEE Transactions on* 30.2 (2008): 228-242, which is incorporated herein by reference.

In some embodiments, the foreground elements can also be enhanced in other ways. For example, users may desire a self-portrait that appears to be taken using a tripod or captured by another person. However, in order to obtain the self-portrait, the user may be required to hold the device away from his body by extending his arm to a full length and lifting his shoulder upward, which may result in an awkward pose for the representation of the user in the self-portrait. In at least some embodiments, multiple users can capture separate sets of images that can be used to generate a composite foreground instance that excludes the undesired pose. For instance, a first user may capture first self-portrait image data by panning right to left. The device may then be operated by a second user who may capture second self-portrait image data by panning left to right. The first self-portrait image data and second self-portrait image data can be composited to generate a preferred pose of each of the first user and the second user. In another example, the pose and/or facial expression of a first user of a first foreground instance may be determined to be the ideal representation of the first user, and the pose and/or facial of a second user of a second foreground instance may be determined to be the ideal representation of the second user. Instead of being limited to a selection of the first foreground instance or the second ground instance for the self-portrait, certain embodiments enable the representation of the first user to be segmented from the first foreground instance, the representation of the second user to be segmented from the second foreground instance, and the representations of the first user and second user to be composited for the self-portrait image.

In some embodiments, the background of a self-portrait can also be modified in various ways. For example, the boundaries of the background of the self-portrait can be statically defined to comport with standard image formats. In other embodiments, the boundaries of the background may be dynamically determined based on the image data captured by the user. For instance, the dimensions of the background can be based on the maximum horizontal and vertical motion of the device during image capture, with missing portions filled in using inpainting. Alternatively, the dimensions of the background may correspond to a projection best fitting the pixels actually captured by the user. Further, the user can re-crop the background to a larger size (with inpainting) or a smaller size.

Figure 6:
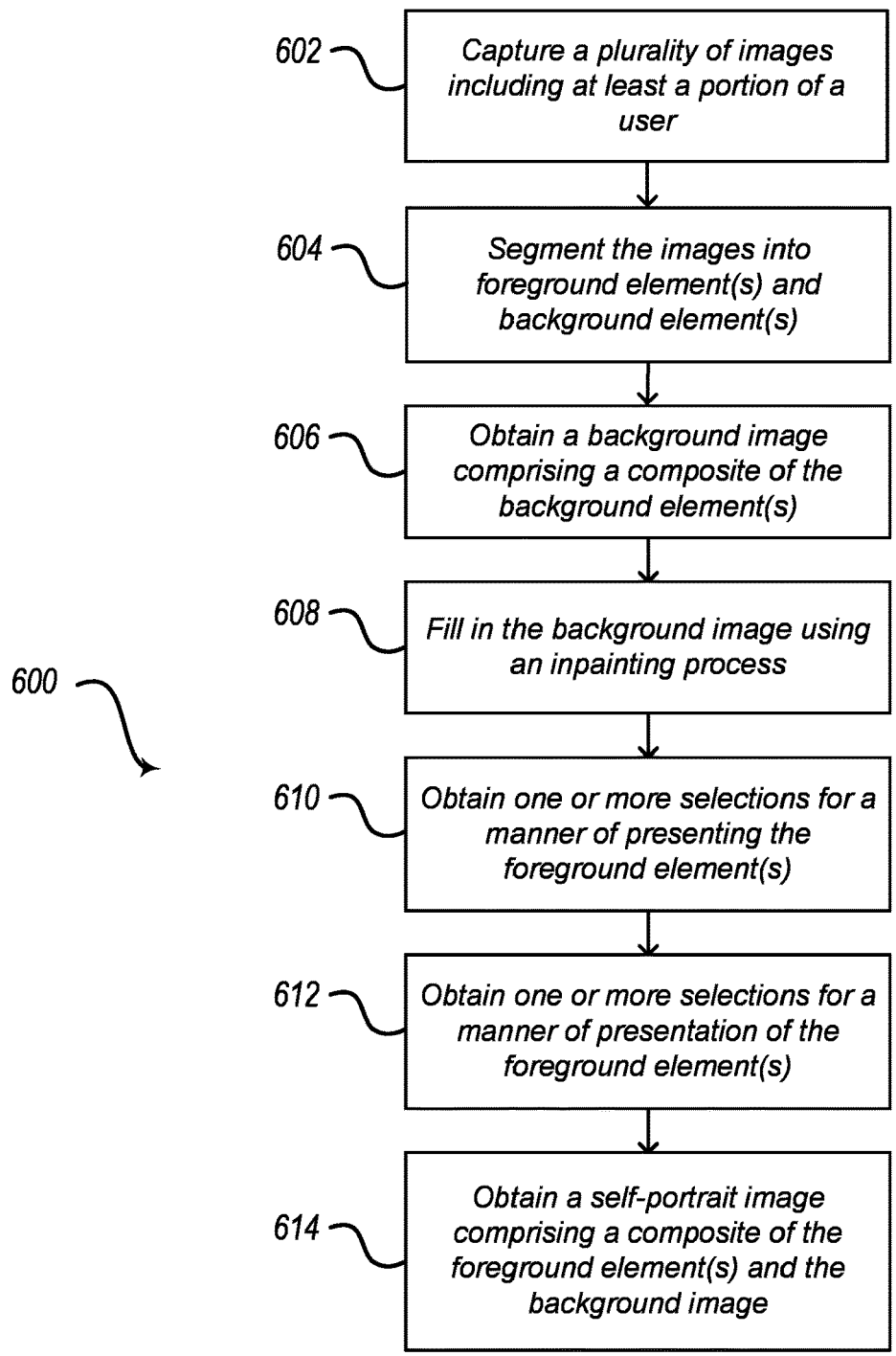
FIG. 6 illustrates an example process for obtaining an optimized self-portrait image in accordance with an embodiment.

FIG. 6 illustrates an example process 600 for acquiring optimized self-portrait images that can be used in accordance with an embodiment. It should be understood that, for any process discussed herein, there can be additional, fewer, or alternative steps performed in similar or alternative orders, or in parallel, within the scope of the various embodiments unless otherwise stated. In this example, the process can be initiated by starting up an application on a computing device enabling a user to take a self-portrait, such as a general camera application or a dedicated application for self-portraiture. A plurality of images can be captured by at least one camera of the device with at least a subset of the images including at least a portion of a representation of the user 602. As mentioned, the images may be captured according to a camera being operated in video capture mode, a sampling rate based on the content of the image data, a sampling rate based on motion of the device (e.g., inertial sensors, GPS, optical flow, etc.), multiple cameras or other image capturing elements, or some combination thereof. In this example, the images are stored in memory of the computing device. In other embodiments, the images can be uploaded to a remote server system for additional processing.

The images can be segmented according to foreground elements and background elements 604. The foreground elements include at least a portion of the user. The foreground elements can be segmented from the background elements based on optical flow, mean-shift clustering, graph cuts, or active contours. The segmented background elements can be composited to generate a single background image 606. As discussed, in at least some embodiments, a user may capture background image data prior to taking a self-portrait. These non-occluded background images can also be used to generate the composite background image. Certain post-processing can be performed on the background image, such as blending, feathering and center-weighting, Laplacian pyramid blending, gradient domain blending, or high dynamic range imaging. In some embodiments, portions of the background image that may be missing due to occlusion by foreground elements or failure by the user to capture certain parts of a scene. These missing regions of the background image can be filled in using inpainting 608.

The foreground elements can also be modified or enhanced in various ways. An instance of the foreground elements can be selected as the default to be used for the self-portrait image. Each of the foreground instances can be analyzed using facial detection processes to determine an "ideal" foreground instance. For example, an ideal foreground instance may comprise an instance in which each user's face is directed towards the camera, each user's eyes are open, each user is smiling, and other such characteristics. In other embodiments, representations of each user may be analyzed separately and the ideal representation of each user can be registered or stitched together to generate an ideal composite foreground instance. In some embodiments, multiple foreground instances can also be composited to remove undesirable elements. For example, users may not wish to include a view of a user's arm extended to capture a self-portrait. In one embodiment, a first user may pan or otherwise move the device to capture a first set of images and the device can then be operated by a second user to pan or otherwise move the device to capture a second set of images. The two sets of images can be aggregated, which can result in an improved composite background image if the users are located in different positions. Further, different poses of the users can be captured and combined for an improved composition of the representation of the users, such as representations of the user that exclude a view of the users' arms extended to capture the self-portrait. In some embodiments, other image characteristics can also be selected by default to minimize user effort in obtaining an optimized self-portrait, such as exposure of the background elements, exposure of the foreground elements, foreground instance size or position, etc. Once optimized foreground and background elements have been selected and/or generated 610, the foreground elements and the background elements can be composited to generate the self-portrait 612. Additional post-processing can also be performed on the self-portrait composition, such as image matting to remove or reduce artifacts and other pixel differences between the foreground image data and the background image data.

Figure 7:
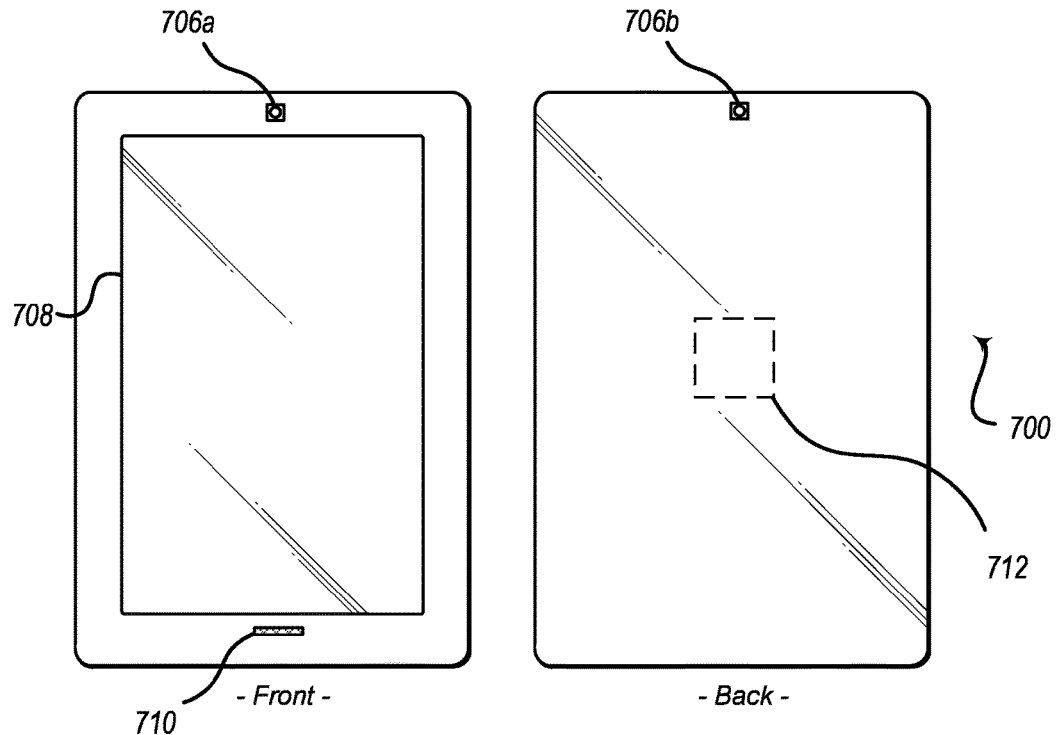
FIG. 7 illustrates an example of a computing device that can be used in accordance with various embodiments.

FIG. 7 illustrates an example computing device 700 that can be used to perform approaches described in accordance with various embodiments. In this example, the device includes cameras 706a and 706b located respectively on a same and opposite side of the device as a display element 708, and enabling the device to capture images in accordance with various embodiments. The computing device includes audio output element 710, such as a microphone, to receive audio input from a user. The computing device also includes an inertial measurement unit (IMU) 712, comprising a three-axis gyroscope, three-axis accelerometer, and magnetometer that can be used to detect the motion of the device, from which position and/or orientation information can be derived.

Figure 8:
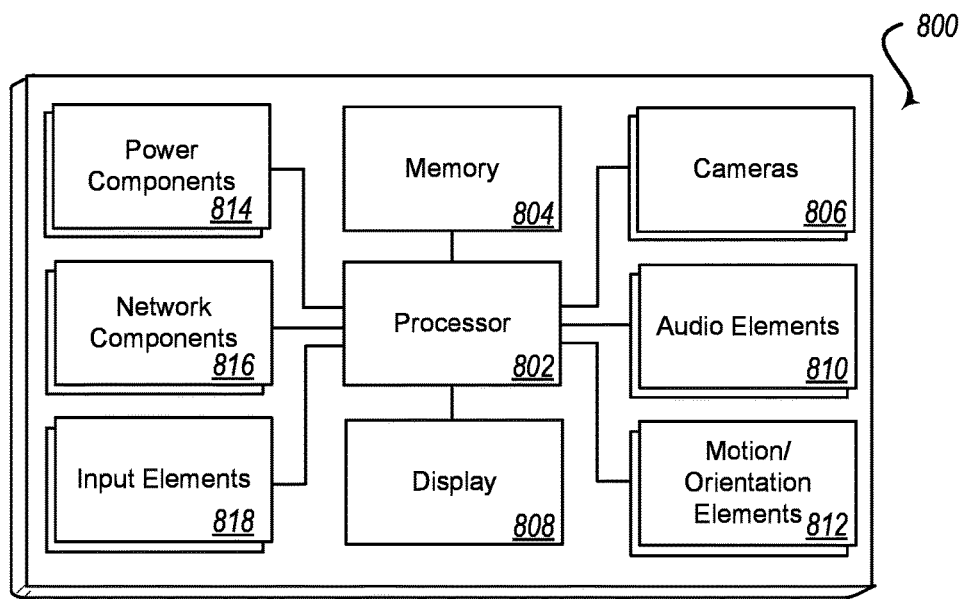
FIG. 8 illustrates an example configuration of components of a computing device such as that illustrated in FIG. 7.

In order to provide various functionality described herein, FIG. 8 illustrates an example set of basic components of a computing device 800, such as the device 700 described with respect to FIG. 7. In this example, the device includes at least one central processor 802 for executing instructions that can be stored in at least one memory device or element 804. As would be apparent to one of ordinary skill in the art, the device can include many types of memory, data storage or computer-readable storage media, such as a first data storage for program instructions for execution by the processor 802, the same or separate storage can be used for images or data, a removable storage memory can be available for sharing information with other devices, etc.

The device typically will include some type of display element 808, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology. As discussed above, the device in many embodiments will include one or more cameras 806, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device. An image capture element can include, or be based at least in part upon any appropriate technology, such as a CCD or CMOS image capture element having a sufficient resolution, focal range, viewable area, to capture an image of the user when the user is operating the device.

The device, in many embodiments, will include at least one audio element 810, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one or more motion and/or orientation elements 812 that provide information such as a position, direction, motion, or orientation of the device. These one or more motion and/or orientation determining elements 812 can include, for example, accelerometers, inertial sensors, electronic gyroscopes, electronic compasses, and GPS elements.

The example device can also include one or more additional input devices 818 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

The example device also includes one or more wireless components 814 operable to communicate with one or more portable computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 816 known in the art for providing power to a portable computing device, which can include capacitive charging elements for use with a power pad or similar device as discussed elsewhere herein. The example device also can include at least one touch and/or pressure sensitive element 818, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 9:
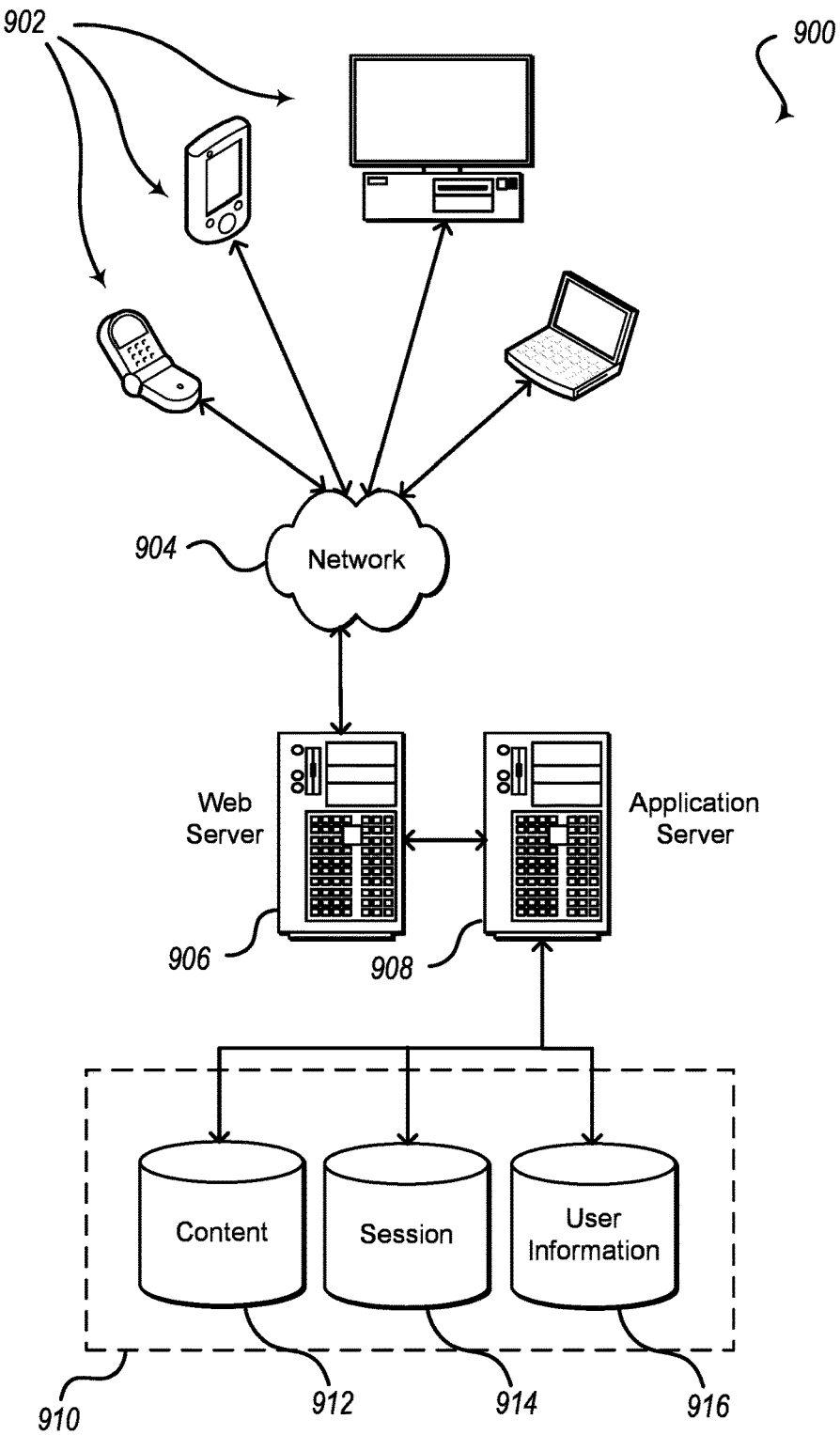
FIG. 9 illustrates an example environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claim.

What is claimed is:

1. A computer-implemented method, comprising:
obtaining a plurality of images;
determining one or more background elements from each of the plurality of images;
determining a plurality of foreground elements from each of the plurality of images;
generating a background image comprising a first composite of at least a portion of the one or more background elements;
determining a score of each of the plurality of foreground elements according to one or more visual characteristics;
obtaining a selection of at least one instance of the plurality of foreground elements from at least a subset of the plurality of images based at least in part on the determined score associated with the at least one instance of the plurality of foreground elements; and
generating a composite self-portrait image by compositing the selected at least one of the plurality of foreground elements and the background image, the composite self-portrait image comprising the selected at least one of the plurality of foreground elements having the highest determined score with respect to each other foreground element of the plurality of foreground elements.

2. The computer-implemented method of claim 1, wherein the plurality of foreground elements include at least a portion of representations of one or more users.

3. The computer-implemented method of claim 1, wherein the one or more visual characteristics include one or more facial features corresponding to the representations of the one or more users.

4. The computer-implemented method of claim 1, further comprising:
obtaining one or more selections relating to display of the background image,
wherein the self-portrait image is rendered based at least in part upon the one or more selections.

5. The computer-implemented method of claim 4, wherein the one or more selections relating to display of the background image include at least one of a boundary of the background image or an exposure of the background image.

6. A computing device, comprising:
one or more processors;
one or more cameras;
memory including instructions that, when executed by the one or more processors, cause the computing device to:
obtain a plurality of images;
determine one or more background elements from each of the plurality of images;
determine a plurality of foreground elements from each of the plurality of images;
generate a background image comprising a first composite of at least a portion of the one or more background elements;
determine a score of each of the plurality of foreground elements according to one or more visual characteristics;
obtaining a selection of at least one instance of the plurality of foreground elements from at least a subset of the plurality of images based at least in part on the determined score associated with the at least one instance of the plurality of foreground elements; and
generate a composite self-portrait image by compositing the selected at least one of the plurality of foreground elements and the background image, the composite self-portrait image comprising the selected at least one of the plurality of foreground elements having the highest determined score with respect to each other foreground element of the plurality of foreground elements.

7. The computing device of claim 6, wherein the plurality of foreground elements include at least a portion of representations of one or more users.

8. The computing device of claim 6, wherein the one or more visual characteristics include one or more facial features corresponding to the representations of the one or more users.

9. The computing device of claim 6, wherein the instructions, when executed to generate the background image, further enable the computing device to:
generate a preliminary background image by stitching together at least the portion of the one or more background elements; and
fill in at least a portion of the preliminary background image using an inpainting process.

10. The computing device of claim 6, wherein the instructions, when executed by the one or more processors, further enable the computing device to:
obtain one or more selections relating to display of the background image,
wherein the self-portrait image is rendered based at least in part upon the one or more selections.

11. The computing device of claim 10, wherein the one or more selections relating to display of the background image include at least one of a boundary of the background image or an exposure of the background image.

12. A non-transitory computer-readable storage medium storing instructions which, when executed by a processor, cause the processor to:
obtain a plurality of images;
determine one or more background elements from each of the plurality of images;
determine a plurality of foreground elements from each of the plurality of images;
generate a background image comprising a first composite of at least a portion of the one or more background elements;
determine a score of each of the plurality of foreground elements according to one or more visual characteristics;
obtain a selection of at least one instance of the plurality of foreground elements from at least a subset of the plurality of images based at least in part on the determined score associated with the at least one instance of the plurality of foreground elements; and
generate a composite self-portrait image by compositing the selected at least one of the plurality of foreground elements and the background image, the composite self-portrait image comprising the selected at least one of the plurality of foreground elements having the highest determined score with respect to each other foreground element of the plurality of foreground elements.

13. The non-transitory computer-readable storage medium of claim 12, wherein the plurality of foreground elements include at least a portion of representations of one or more users.

14. The non-transitory computer-readable storage medium of claim 12, wherein the one or more visual characteristics include one or more facial features corresponding to the representations of the one or more users.

15. The non-transitory computer-readable storage medium of claim 12, wherein the instructions, when executed to generate the background image, further cause the processor to:
   generate a preliminary background image by stitching together at least the portion of the one or more background elements; and
   fill in at least a portion of the preliminary background image using an inpainting process.

16. The non-transitory computer-readable storage medium of claim 12, wherein the instructions, when executed by the processor, further cause the processor to:
   obtain one or more selections relating to display of the background image, wherein the one or more selections relating to display of the background image include at least one of a boundary of the background image or an exposure of the background image; and
   wherein the self-portrait image is rendered based at least in part upon the one or more selections.

* * * * *